Patented July 3, 1934

1,965,369

UNITED STATES PATENT OFFICE 1,965,369

CHEMICAL PRODUCTS AND PROCESSES FOR PRODUCING SAME

Wallace H. Carothers, Fairville, Pa., and Gerard J. Berchet, Wilmington, Del., assignors to E. I. du Pont de Nemours & Company, Wilmington, Del., a corporation of Delaware No Drawing. Application January 26, 1932, Serial No. 589,052

36 Claims. (Cl. 260—6)

This invention is concerned with certain new and useful products and processes for preparing them. More particularly, it is concerned with the new compounds dichloro-2,3-butadiene-1,3, and trichloro-1,2,3-butadiene-1,3, with their preparation, and with their transformation into polymers which are new and useful products.

A copending application of Carothers and Collins, Serial No. 409,538, filed October 22, 1930 discloses the preparation of certain new compounds by the addition of hydrogen chloride to monovinylacetylene. These compounds include chloro-2-butadiene-1,3, $CH_2=C(Cl)—CH=CH_2$; chloro-4-butadiene-1,2, $CH_2=C=CH—CH_2Cl$; and dichloro-2,4-butene-2, $CH_3—C(Cl)=CH—CH_2Cl$. The products of the present invention are derived from these compounds by the addition of chlorine and by the subsequent elimination of hydrogen chloride from these addition products.

One object of the invention relates to the preparation of new and useful polymers. Other objects pertain to the preparation of novel halogenated hydrocarbons useful as intermediates for the preparation of polymers.

According to the present invention we first treat one of the compounds, chloro-4-butadiene-1,2 or dichloro-2,4-butene-2, with chlorine. This is suitably done by passing gaseous chlorine into the compound. The compound may be dissolved in an inert solvent such as carbon tetrachloride or not, and the chlorination may be carried out at any temperature between —50° C. and the boiling point of the compound; but the proportion of the various products differs considerably according to the conditions adopted for the chlorination as is more fully illustrated below.

The chlorination in this manner of dichloro-2,4-butene-2 leads to the following novel products:

Tetrachloro-2,2,3,4-butane,
$$CH_3—CCl_2—CHCl—CH_2Cl$$
Trichloro-2,3,4-butene-1,
$$CH_2=C(Cl)—CHCl—CH_2Cl, \text{ and}$$
Pentachloro-1,2,2,3,4-butane,
$$CH_2Cl—CCl_2—CHCl—CH_2Cl$$

In a similar manner the chlorination of chloro-4-butadiene-1,2 leads to the following novel products:

Trichloro-2,3,4-butene-1,
$$CH_2=CCl—CHCl—CH_2Cl$$
Trichloro-1,2,4-butene-2,
$$CH_2Cl—C(Cl)=CH—CH_2Cl$$
Pentachloro-1,2,2,3,4-butane,
$$CH_2Cl—CCl_2—CHCl—CH_2Cl$$

In either case the various products are readily separated from one another by fractional distillation.

The following examples illustrate this process:

EXAMPLE 1A

Chlorination of dichloro-2,4-butene-2 at —50° C.

Six moles (750 g.) of dichloro-2,4-butene-2, with or without a solvent such as carbon tetrachloride, are treated with chlorine at a temperature of about —50° C. with constant mechanical stirring, until an increase in weight amounting to about 300 g. is attained. This operation is attended by a copious evolution of HCl gas. The mixture is then allowed to warm up while a stream of air is passed through it to drive off the undissolved HCl. The mixture is then dried over a drying agent such as $MgSO_4$ and an alkaline agent such as $K_2CO_3$ and distilled.

Substantially three fractions are collected:

1. Trichloro-2,3,4-butene-1 at 36–40° C./6 mm. _____ 70%
2. Tetrachloro-2,2,3,4-butane at 51–55° C./6 mm. _____ 10%
3. Pentachloro-1,2,2,3,4-butane at 82–86° C./6 mm. _____ 20%

The percentages given above indicate the approximate ratio in which the different products are formed in a typical experiment. There is also produced a small amount of resinous material which remains as a residue from the distillation.

EXAMPLE 1B

Chlorination of dichloro-2,4-butene-2 at 45–60° C.

Two moles (250 g.) of dichloro-2,4-butene-2 are treated with chlorine at a temperature of 45° to 60° C. with constant mechanical stirring, until an increase in weight of 86 g. is attained. The temperature is maintained between the said limits by occasional cooling of the flask. The weight of HCl evolved is approximately half of that evolved during chlorination of the same weight of dichloro-2,4-butene-3 at the temperature of solid carbon dioxide-acetone. The chlorination product is then dried over an alkaline agent such as $K_2CO_3$ and distilled. As in the preceding example, substantially three fractions are collected:

1. Trichloro-2,3,4-butene-1 at 37–41° C./10 mm. _____ 28%
2. Tetrachloro-2,2,3,4-butane at 52–60° C./9 mm. _____ 54%
3. Pentachloro-1,2,2,3,4-butane at 78–84° C./9 mm. _____ 18%

The percentages given above indicate the proportions in which the different products are formed in a typical experiment. Some resinous material is also produced and remains as a residue from the distillation.

EXAMPLE 2A

*Chlorination of chloro-4-butadiene-1,2 at low temperature*

Six moles (531 g.) of chloro-4-butadiene-1,2 with or without a solvent such as carbon tetrachloride are treated with chlorine at a temperature of about —50° C. until the mixture has increased in weight by about 420 g. This is attended by a copious evolution of HCl gas (roughly 1 mol per 3 mols of 4-chloro-1,2-butadiene). The mixture is then allowed to warm up to room temperature in a stream of dry air, dried over MgSO₄ and K₂CO₃ and distilled. Substantially four fractions are collected:

1. Trichloro-2,3,4-butene-1 at 41–43° C./11 mm._____38%
2. Trichloro-1,2,4-butene-2 at 62–65° C./11 mm._____31%
3. Tetrachlorobutene at 74–77° C./11 mm.___ 10%
4. Pentachloro-1,2,2,3,4-butane at 85–90° C./11 mm._____ 21%

The percentages given above indicate the approximate proportions in which the different products are formed in a typical experiment. There is also formed a small amount of resinous material which remains as a residue from the distillation.

EXAMPLE 2B

*Chlorination of chloro-4-butadiene-1,2 at 40°–50° C.*

Three mols (265.5 g.) of chloro-4-butadiene-1,2 with or without a solvent such as carbon tetrachloride, are treated with chlorine, the temperature of the reaction mixture being kept at 40°–50° C. by means of a suitable cooling bath until the mixture has increased in weight by about 210 g. Practically no HCl is evolved under these conditions. The product is dried over a drying agent such as MgSO₄ and distilled. This gives substantially three fractions:

1. Trichloro-2,3,4-butene-1 at 41–43° C./10 mm._____ 10%
2. Trichloro-1,2,4-butene-2 at 65° C./10 mm. _____ 60%
3. Pentachlorobutane at 85° C./10 mm._____ 30%

No tetrachlorobutene is formed under these conditions.

The percentages given above indicate the proportions in which the various products are formed in a typical experiment. Some resinous material is also produced and remains as a residue from the distillation.

EXAMPLE 2C

*Exhaustive chlorination of chloro-4-butadiene-1,2*

Chloro-4-butadiene-1,2 with or without a solvent such as carbon tetrachloride, is treated with chlorine until this gas is no longer absorbed, the temperature being kept between 40° and 60° C. by suitable cooling. Practically no HCl is evolved under these conditions. The crude product is dried over a drying agent such as calcium chloride and distilled. This gives substantially a single product, namely, pentachloro-1,2,2,3,4-butane, boiling at 77°–83° C./5 mm.

According to the second major step in the process of the present invention we treat one of the novel chlorinated compounds of the character described above, with an alkaline agent, such as a cold alcoholic solution of potassium hydroxide or sodium hydroxide. This results in the loss of hydrogen chloride with the formation of other new derivatives. Thus, by treating trichloro-2,3,4-butene-1 with an alkaline agent we obtained the new compound dichloro-2,3-butadiene-1,3;

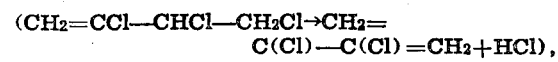

and in a similar manner from pentachloro-1,2,2,3,4-butane we obtain the new compound trichloro-1,2,3-butadiene-1,3;

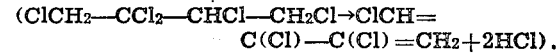

These products readily separate as oils from the reaction mixture when it is diluted with water, and they can be drawn off and purified by distillation, or under certain conditions they can be distilled directly from the reaction mixture. The distillation is preferably carried out under diminished pressure, and it is desirable to add to the compounds an antioxidant such as catechol, hydroquinone, or pyrogallol before attempting to distill them to prevent polymerization during distillation. The phase of the invention which includes treatment of the polychlor compounds with alkali is illustrated in the following example:

EXAMPLE 3

*Action of an alkaline agent on trichloro-2,3,4-butene-1:*

This reaction gives dichloro-2,3-butadiene-1,3 by removal of one mol of HCl.

In a flask provided with a mechanical stirrer is placed 200 g. of potassium hydroxide dissolved or suspended in 800 cc. of methyl alcohol. To this mixture is added with constant stirring 525 g. of trichloro-2,3,4-butene-1 at such a rate that the temperature of the mixture is kept below 20° C. Potassium chloride separates immediately. After addition of all of the trichlorobutene the mixture is stirred from one to two hours at low temperature, then poured into a large volume of water. Dichloro-2,3-butadiene-1,3 separates at the bottom in the form of a heavy oil which is decanted, washed with water and dried over a drying agent such as MgSO₄. It is distilled over an antioxidant such as hydroquinone, preferably under reduced pressure. It boils at 40°–45° C./85 mm.

EXAMPLE 4

*Action of an alkaline agent on pentachloro-1,2,2,3,4-butane:*

This reaction gives trichloro-1,2,3-butadiene-1,3 by removal of 2 mols of HCl.

In a flask provided with a mechanical stirrer is placed 1 mol of KOH dissolved or suspended in four times its weight of methyl alcohol. To this mixture is added with constant stirring ½ mol of pentachlorobutane, the temperature of the mixture being kept about 40° C. by suitable means. Potassium chloride separates immediately. After addition of all of the pentachlorobutane the mixture is stirred from 1 to 2 hours, then poured into a large volume of water. The heavy oil at the bottom is decanted, dried over a drying agent such as MgSO₄ and distilled, preferably under reduced pressure. Distillation gives substantially 2 fractions:

1. Trichloro-1,2,3-butadiene-1,3 at 34° C./7 mm.
2. Tetrachloro-1,2,2,3-butene-3 at 42° C./7 mm.

It is to be understood that the examples given above are illustrative only. Similar effects can be produced by the use of other alkaline agents or agents capable of neutralizing hydrochloric acid. As examples of such agents we may mention sodium hydroxide, calcium hydroxide, calcium oxide, calcium carbonate, sodium carbonate, potassium carbonate, soda lime, sodium ethylate, zinc oxide, magnesium oxide, quinoline, etc. Moreover the use of alcohol as a reaction medium is not essential. The reaction may be carried out in the presence of other liquids, e. g., water, and also under certain conditions in the absence of any diluent.

The dichloro-2,3-butadiene-1,3 obtained in the manner indicated above is a colorless liquid boiling at about 98° C. at ordinary pressure and having a density at 20° C. of 1.185 and a refractive index of 1.489. It shows an extraordinary tendency to undergo polymerization. Thus on standing at room temperature in the presence of air and light it is completely polymerized in 24 hours, and at 85°–90° C. the polymerization is complete in about 30 minutes. The properties of the polymer vary somewhat according to the conditions under which it is formed. In general, the first product is a white solid, hard, very tough, slightly elastic, and practically insoluble in all common solvents.

The tendency of this dichlorobutadiene to polymerize is greatly diminished by the presence of inhibitors comprising most of the common antioxidants illustrated for example by hydroquinone, catechol, pyrogallol and phenyl-$\beta$-naphthylamine. These materials although they are in general not capable of permanently preventing the polymerization of the dichlorobutadiene do nevertheless make it possible to store specimens of the latter compound in its monomeric form without significant change over considerable periods of time; and the life of such stabilized specimens is further increased by storing them at low temperatures in the absence of light and in containers free of air.

As already indicated, the rate of polymerization of dichlorobutadiene is greatly increased by elevated temperature. Other factors that have an accelerating influence are light (especially ultraviolet light and the shorter wave lengths of the visible spectrum), elevated pressure, oxygen (air), and oxidizing agents such as organic and inorganic peroxides.

Factors that influence the rate of polymerization also have a considerable effect on the physical properties of the polymeric product. Thus, the polymers produced at elevated temperature (e. g., 80°–90° C.) are, at least in the early stages of the polymerization, colorless, transparent, fairly soft and plastic whereas the polymers produced at lower temperatures generally separate from the monomer as fast as they are produced as hard, tough, opaque white solids. The plastic polymers obtained by the use of elevated temperature, are converted on standing especially when heated, into hard, non-plastic polymers. The other accelerating effects mentioned above may also be used to control the properties of the polymeric products: polymerization under elevated pressure, of the order, 1 to 10,000 atmospheres for example, leads to very dense, hard products. The repressing effects of inhibitors, already referred to, may also be employed to control the rate of polymerization and influence the properties of the products.

As already mentioned above, the polymers produced at elevated temperatures (e. g., 80°–90° C.) are, at least in the early stages of the polymerization, colorless, transparent, homogeneous, soft, and plastic. These plastic materials may be mixed with fillers, dyes, antioxidants, and stabilizers of various kinds and molded into any desired shape. By the further action of heat and/or pressure, or merely by standing the plastic polymers can then be converted into the non-plastic insoluble form.

Typical examples illustrating modes of polymerizing dichloro-2-butadiene-1,3 are as follows:

EXAMPLE 5

*Polymerization of dichloro-2,3-butadiene-1,3 at room temperature*

A clear sample of dichloro-2,3-butadiene-1,3 at room temperature and in diffused light becomes cloudy in from 1 to 3 hours. A white solid begins to separate in from 2 to 4 hours, the bulk of which increases until the whole mass is solid, in about 12 to 16 hours. The polymerization is practically complete within 24 to 36 hours. Within 2 or 3 days the polymer is a white, opaque solid, hard, dense, coherent, non-elastic and non-plastic, practically odorless, and very insoluble in the common solvents.

EXAMPLE 6

*Polymerization of dichloro-2,3-butadiene-1,3 at other temperatures*

A clear sample of dichloro-2,3-butadiene-1,3 heated 30 minutes at 80°–90° C. is practically completely polymerized to a colorless, transparent, plastic, somewhat elastic mass capable of being shaped and molded. On further heating or on standing it quickly sets up to an opaque, tough, hard, coherent mass. On the other hand, a sample kept in an ice box at a temperature of 5°–9° C. begins to show signs of polymerization only after 4 days. A sample may be kept over 2 weeks at a temperature of −50° C. without change.

EXAMPLE 7

*Polymerization of dichloro-2,3-butadiene-1,3 in solution*

Dichloro-2,3-butadiene-1,3 in solution in solvents such as benzene, acetone, chloroform, ethyl acetate, toluene, and "cellosolve", and in concentrations from 5 to 50%, heated from 15 minues to 2 hours at 80°–90° C. or left standing from 3 to 48 hours at room temperature, gives viscous solutions from which a solid separates rapidly. This polymer has the same characteristics as that obtained without solvents, but it is frequently obtained as a white, non-coherent mass.

The extraordinary speed of the polymerization of dichlorobutadiene and the peculiar properties of its polymers make it useful for a variety of purposes. Thus, it may be used either alone or mixed with modifying ingredients as a starting material for the fabrication of molded objects. Modifying ingredients such as fillers, diluents, extenders, softeners, plasticizers, dyes, pigments, and stabilizers may be used to produce the most diverse effects. Thus, for example, mineral powders such as gypsum or slate may be moistened with the dichlorobutadiene or may be mixed with its plastic polymer and the resulting pasty or dough-like mass may be molded to any desired shape and allowed to harden under the influence of heat or pressure or both.

Since dichloro-2,3-butadiene-1,3 is a thin, mobile liquid it is readily absorbed by porous or bibulous materials, such as cloth, paper, leather, wood, brick, unglazed porcelain, etc.; the imbibed dichlorobutadiene is then easily polymerized in situ merely by allowing the object to stand at ordinary or slightly elevated temperatures, e. g., from 15 to 60° C. In this way porous objects become impregnated by polymer with a degree of intimacy and effectiveness that is impossible to achieve when the polymer itself or its solutions are used as the impregnating agent. The extraordinary speed with which the dichlorobutadiene polymerizes, and the unusual resistance of its polymers in their final form to the action of organic and inorganic solvents as well as chemical agents generally make it especially valuable for the uses described above.

Dichlorobutadiene may also be polymerized in emulsion. Thus, if dichlorobutadiene is stirred with an equal volume of a 2% aqueous solution of sodium oleate, a stable fluid, milk-like emulsion is obtained. The emulsified dichlorobutadiene polymerizes very rapidly and yields a stable latex from which the polymer is easily recovered by the addition of acid, or by allowing the water to evaporate, e. g., in a thin layer on a plate of porous porcelain. The polymer obtained in this way is generally opaque and very insoluble.

Dichloro-2,3-butadiene-1,3 may also be polymerized in the presence of other polymeric materials such as phenolformaldehyde resins, urea-formaldehyde resins, polybasic acid-polyhydric alcohol resins, thiourea-formaldehyde resins, vinyl resins, cumarone resins, rubber, chlorinated rubber, etc. It may also be polymerized in admixture with other substances capable of undergoing polymerization at the same time, such as styrene, vinyl chloride, vinyl acetate, indene, butadiene, and isoprene.

Novel and especially valuable products are obtained by polymerizing mixtures of chloro-2-butadiene-1,3 (a compound the polymerization of which is already described in a copending application of Carothers and Collins, Serial No. 519,243, filed February 28, 1931) with dichloro-2,3-butadiene-1,3. According to the proportions of the components of the initial mixture and depending upon the conditions under which the polymerization is effected the resulting polymers may have the most diverse properties. In general, those derived from mixtures containing a large proportion of the monochlorobutadiene are transparent, exceedingly elastic, and very resilient; while those derived from mixtures containing larger proportions of the dichlorobutadiene (up to 50%) are less resilient, but are still transparent, elastic, strong, and exceedingly tough. The polymerization of mixtures of monochloro- and dichloro-butadiene containing larger proportions of the latter than 50% by weight usually leads to opaque products which are sometimes lacking in homogeneity and coherence.

In general, the polymerization of mixtures of mono- and dichlorobutadiene involves the simultaneous polymerization of the two components, and it appears further that the molecules of the polymeric product result from the mutual reaction of the two species of monomeric molecules. Thus, the polymeric product of such mixtures even in the early stages of the polymerization corresponds in composition with the mixture rather than with the dichlorobutadiene which is the more reactive of the two species.

The polymerization of mixtures of chloro-2-butadiene-1,3 and dichloro-2,3-butadiene-1,3 can be carried out under the most diverse conditions: at ordinary, lowered, or elevated temperatures; at ordinary or elevated pressures; in the presence of light or not; in the presence or not of air or oxygen. Catalysts such as organic or inorganic peroxides may be added if desired; and other ingredients may be added such as solvents, softeners, plasticizers, lubricants, fillers, extenders, inhibitors, antioxidants, stabilizers, accelerators, dyes, pigments, and acid acceptors, or substances capable of combining with free acid, such as ammonia, free alkalies, alkali salts, fatty acids, zinc oxide, magnesium oxide, heavy metal salts of fatty acids, e. g., zinc stearate, etc.

The present preferred embodiments of this part of the invention generally involve the use of proportions ranging from 1% to 20% by weight of the dichlorobutadiene based on the total weight of dichlorobutadiene and monochlorobutadiene; and it is generally preferred to carry out the polymerization either (1) in aqueous emulsion or (2) in the presence of light.

According to the first of these methods the mixture of the two dienes is emulsified with water containing an emulsifying agent such as sodium oleate, and the emulsion is allowed to stand until the polymerization is complete. At this stage it is generally desirable to add to the latex an antioxidant such as phenyl-$\beta$-naphthylamine. The resulting product is an artificial rubber latex, from which by coagulation, as by the addition of acetic acid, the rubber-like polymer is readily isolated.

Shaped articles are readily made from this latex by methods known to the art, e. g., by dipping into the latex a metal, glass, or porcelain form which may be coated with a coagulating agent or not; and continuous, coherent films or sheets are easily obtained by pouring a layer or puddle of the latex on a plate of porous porcelain and allowing the water to evaporate.

The latices can be extruded through fine holes or slits into a suitable coagulating bath, e. g., one containing acids and/or salts to form threads, bands, or strips. Similarly tubing may be made by extrusion through a suitably shaped orifice. The threads or bands may be wound while still freshly prepared and wet on a mandrel or form to produce shaped articles which after being dried perfectly retain their shape. Fabric such as cloth or paper may be simultaneously wound on the form to produce reinforced articles. Likewise the bands or sheets may be calendered while still wet onto the surface of fabrics to form coated fabrics. Shaped articles may also be produced from the latex by electrodeposition.

The artificial rubber obtained in this way in general resembles a soft vulcanized natural rubber. It is strong and exceedingly elastic and resilient. It is, however, much more resistant to the action of chemical agents than cured natural rubber and it is very much less readily attacked by lubricating oils and gasoline. In all these respects it resembles the rubber prepared by a similar process from chloro-2-butadiene-1,3 alone as described in a copending application of Collins, Serial No. 537,484, filed May 14, 1931. The process of the present invention however has these advantages: the presence of the dichlorobutadiene results in a more rapid polymerization and greater uniformity in the character of the polymer; moreover films or sheets of rubber prepared from this latex by the method described above permanently retain their pliability and show no tendency to freeze or stiffen on aging as films from the unmodified chlorobutadiene latex frequently do.

According to the second preferred method of the present invention mixtures of chloro-2-butadiene-1,3 and dichloro-2,3-butadiene-1,3 are polymerized in the presence of direct light at slightly elevated temperatures and the polymeric product is separated from the unchanged dienes after the reaction has progressed until the mixture has the consistency of a viscous liquid or a soft mass and while a substantial portion of the starting material remains unpolymerized. The separation of the polymerized material may be effected by any of the methods described by Williams in his copending application, Serial No. 519,244, filed February 28, 1931, concerning the preparation of plastic polymerizable polymers of chlorobutadiene. The unpolymerized material may for example be removed by distillation or precipitation.

Polymers prepared in this way are plastic and soluble in the customary rubber solvents. They are easily worked on the rolls of the rubber mill. They can, therefore, be compounded with antioxidants, acid acceptors, fillers, dyes, pigments, softeners, lubricants, and accelerators and subsequently molded into any desired shape. The resulting product is then readily cured or vulcanized by heat; its plastic properties are completely lost and its elastic properties are fully developed, and it is no longer dissolved, but only swelled by the customary rubber solvents.

Examples illustrating the polymerization of mixtures of the character described are as follows:

EXAMPLE 8

*Polymerization of solutions of dichloro-2,3-butadiene-1,3 in chloro-2-butadiene-1,3*

Mixtures of chloro-2-butadiene-1,3 with dichloro-2,3-butadiene-1,3, the concentration of the latter varying from 10 to 50% and at temperatures from 20° to 75° C., give polymers which preserve essentially the features of chloro-2-butadiene-1,3 polymers, while the speed of polymerization is increased, especially at temperatures higher than room temperature. Within the said limits of concentration, the dichlorobutadiene polymer does not separate from the solution as it does from most other solvents (see example 7). The final products are tough, elastic masses resembling cured soft rubber.

EXAMPLE 9

*Polymerization of emulsions of dichloro-2,3-butadiene-1,3 mixed with chloro-2-butadiene-1,3*

Mixtures composed of chloro-2-butadiene-1,3 and dichloro-2,3-butadiene-1,3 in the ratios by weight indicated in the following table are prepared and each mixture is emulsified with an equal weight of water containing 2% of its weight of sodium oleate, the mixtures being surrounded by an ice bath during the emulsification. The resulting emulsions are milk-like fluids. They are allowed to stand in the ice bath for 5 hours and are then removed to a refrigerator maintained at 10° C. The figures in the table indicate the extent of polymerization of some of the samples at various stages. At the end of 48 hours they have not changed in appearance but practically all the chlorobutadiene and dichlorobutadiene have polymerized. The emulsions are each mixed with 0.5% of their weight of ammonia and 0.5% of their weight of phenyl-β-naphthylamine and films are prepared from each by allowing a layer of the emulsion to dry spontaneously on a plate of porous porcelain. The films are finally dried in an oven at 70° C. for 24 hours. The properties of representative films are indicated in the following table.

*Chlorobutadiene and dichlorobutadiene mixtures polymerized in emulsion*

| No. | % chlorobutadiene | % dichlorobutadiene | % polym. 3 hrs. | % polym. 5 hrs. | % polym. 24 hrs. | % polym. 48 hrs. | Tensile strength lbs./in.² | % elongation at break |
|---|---|---|---|---|---|---|---|---|
| 1 | 100 | 0 | 18 | 31 | 84 | 97 | 1550 | 800 |
| 2 | 99 | 1 | 27 | 47 | 95 | 97 | 1800 | 1000 |
| 3 | 98 | 2 | 16 | 31 | 75 | 93 | 1700 | 840 |
| 4 | 95 | 5 | 21 | 36 | 94 | 97 | 1900 | 840 |
| 5 | 90 | 10 | | | | | 2450 | 920 |
| 6 | 80 | 20 | 19 | 35 | 94 | 97 | 1450 | 900 |
| 7 | 70 | 30 | | | | | 1550 | 900 |
| 8 | 60 | 40 | | | | | 1750 | 960 |
| 9 | 50 | 50 | 12.4 | 18.3 | 92 | 95 | 1850 | 800 |
| 10 | 20 | 80 | 23 | 35 | 85 | 95 | Non-coherent. | |
| 11 | 0 | 100 | 0.1 | 0.3 | 85 | 95 | Non-coherent. | |

Film No. 1 "freezes" and stiffens after about 2 weeks at the ordinary temperature; films 2 to 9 inclusive retain their pliability indefinitely even when kept in a refrigerator. Although it appears from the data of the table that at these low temperatures the dichloro-butadiene in certain instances polymerizes more slowly than the chlorobutadiene, at higher temperatures the reverse is invariably true.

EXAMPLE 10

*Preparation of plastic polymerizable polymers from mixtures of chlorobutadiene and dichlorobutadiene*

Mixtures composed of different proportions by weight of chloro-2-butadiene-1,3 and dichloro-2,3-butadiene-1,3 were placed in closed containers of soda glass and exposed directly to the light of a mercury arc (in glass). The rate and extent of reaction are indicated below:

| No. | Temp. | % dichlorobutadiene | Time | % polymer | Time | % polymer |
|---|---|---|---|---|---|---|
| | Deg. C. | Percent | Hours | | Hours | |
| 1 | 25 | 0 | 23 | 6.6 | 50.5 | 14 |
| 2 | 25 | 2 | 23 | 8.8 | 50.5 | 17 |
| 3 | 25 | 5 | 23 | 8.2 | 50.5 | 18 |
| 4 | 29 | 0 | | | 28 | 23 |
| 5 | 29 | 10 | | | 28 | 38 |

All of these samples at the final times indicated above were viscous syrups. The polymers isolated by precipitation with alcohol were plastic. Those derived from the mixtures containing dichlorobutadiene were softer than the corresponding samples derived from chlorobutadiene alone. The samples were separately compounded using for each 100 parts by weight of polymer, 10 parts of zinc oxide, 2 parts of stearic acid, 1 part of benzidine, and 1 part of phenyl-β-naphthylamine. The compounds were placed in molds and cured at 120° C. for 20 minutes. They were thus converted into bands resembling soft vulcanized natural rubber. Like vulcanized natural rubber, they were highly elastic and very strong, but they were much more resistant to the swelling and deteriorating action of gasoline and lubricating oils and more resistant generally to chemical attack. The specimens prepared from chlorobutadiene containing dichlorobutadiene showed no tendency to lose their pliability or become stiff at low temperatures (0° C.).

This process of the present invention involving the polymerization of a mixture of chloro-2-butadiene-1,3 and dichloro-2,3-butadiene-1,3 has the following advantages over the processes previously described in which the former compound is polymerized alone in a similar manner: the polymerization proceeds more rapidly; it may be carried further in the initial stage without danger of yielding a non-plastic polymer; the final cured product shows no tendency to freeze or stiffen on aging.

The trichloro-1,2,3-butadiene-1,3 obtained according to the present invention as already described is a colorless liquid boiling at about 33°–34° C. at 7 mm. and having a density at 20° C. of about 1.409 and a refractive index of 1.526. It polymerizes readily and the polymerization is subject to the same accelerating and inhibiting influence as have already been described for dichlorobutadiene. Its rate of polymerization is, however, very much slower than for the latter compound, and its polymer is less hard, slightly plastic, and slightly elastic. This last species of polymerization is illustrated in the following example:

Example 11

*Polymerization of a trichloro-1,2,3-butadiene-1,3*

A sample of trichlorobutadiene heated to 90° C. for 4 to 8 hours is transformed into a soft, transparent non-plastic, non-rubber-like mass. A similar transformation occurs at the ordinary temperature in 15 to 30 days. Trichlorobutadiene dissolved in such solvents as chloroform, benzene, and acetone polymerizes slowly to form viscous homogeneous solutions. The polymerization of mixtures of chloro-2-butadiene-1,3 and trichloro-1,2,3-butadiene-1,3 yields rubber-like masses which are softer the more trichlorobutadiene is present in the initial mixture.

With due regard for these differences in its physical properties and the speed with which it is formed, the polymer of trichloro-1,2,3-butadiene-1,3 may be adapted to the same uses as those already described for dichloro-2,3-butadiene-1,3.

The following chart constitutes a brief graphical summary of the more salient features of the invention.

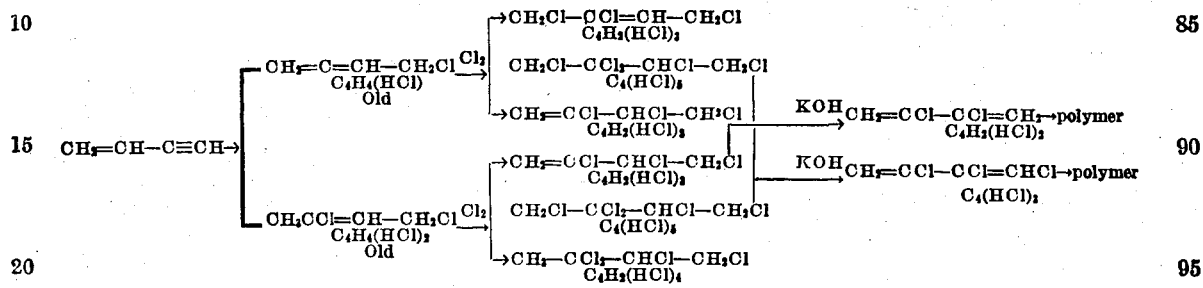

In the above chart, the formulæ of the chlorine containing compounds indicate the number of molecules of hydrogen chloride included within the molecular structure. These compounds may all be embraced within the formula $$C_4H_x(HCl)_y$$

wherein $x$ is 0 when $y$ is 3 or 5, and $x$ is 2 when $y$ is 2, 3 or 4. It will be noted that the specific compound in which $y$ is 4 contains a methyl radical.

The preferred methods for chlorinating hydrohalogen addition products of vinylacetylene have already been described. Hydrohalogen addition products of vinylacetylene other than dichloro-2,4-butene-2 and chloro-4-butadiene-1,2 may be chlorinated in the same manner. Thus, the chlorination of chloro-2-butadiene-1,3 at temperatures varying from —80° C. to 60° C. yields chlorine derivatives comprising trichloro-2,3,4-butene-1, trichloro-1,3,4-butene-2, and pentachlorobutane.

Also bromination of bromo-2-butadiene-1,3 in solution in chloroform at room temperature yields a tribromobutene boiling at 129° to 132° C. at 17 mm. and having a density at 20° C. of about 2.3125.

Also chloro-4-butadiene-1,2 when dissolved in chloroform and treated with bromine with slight warming reacts readily, two atoms of bromine being absorbed per mole of chloro-4-butadiene-1,2. The resulting dibromochlorobutene boils at 119 to 122° C. at 27 mm.

The invention is not limited to the specific illustrations or embodiments contained in the above description. Compounds similar to those described, but containing halogen atoms other than chlorine, may be prepared by the same general processes described in connection with the preparation of the chlorine-containing compounds. Thus, bromine may be reacted with bromo-4-butadiene-1,2, with dibromo-2,4-butene-2, or with bromo-2-butadiene-1,3 to produce new compounds corresponding to those obtained by similar treatment of corresponding chlorine-substituted products with chlorine and these new reaction products may be subjected to caustic alkali to produce new compounds which may readily be polymerized. Or the hydrogen chloride addition products of monovinylacetylene may be reacted with bromine, or the hydrogen bromide addition products of monovinylacetylene may be reacted with hydrogen chloride, and then be subjected to caustic treatment, followed by polymerization. Compounds containing halogens other than bromine or chlorine may be obtained in a similar manner. Any modification which conforms to the spirit of the invention is intended to be included within the scope of the claims.

We claim:

1. A process which comprises reacting halogen with a hydro-halogen addition product of monovinylacetylene.

2. A product produced by the process of claim 1.

3. A process which comprises reacting chlorine with a hydrogen chloride addition product of monovinylacetylene.

4. A product produced by the process of claim 3.

5. A process which comprises reacting chlorine with a hydrogen chloride addition product of monovinylacetylene and subjecting the resulting product to treatment with a caustic alkali.

6. A product produced by the process of claim 5.

7. A process which comprises reacting chlorine with a hydrogen chloride addition product of monovinylacetylene, then subjecting the resulting product to treatment with caustic alkali and polymerizing a reaction product resulting from the caustic treatment.

8. A polymer produced by the process of claim 7.

9. Straight-chain chlorine-containing compounds corresponding to the formula:

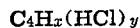

in which $x$ is 0 or 2, and $y$ is either 3 or 5 when $x$ is 0 and is 2, 3 or 4 when $x$ is 2, further characterized in that when $y$ is 4, the molecular structure contains a methyl group.

10. A straight-chain chlorine-containing compound having the following formula:

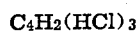

11. Trichloro-2,2,4-butene-2.

12. Dichloro-2,3-butadiene-1,3.

13. Trichloro-2,3,4-butadiene-1,3.

14. A polymer of dichloro-2,3-butadiene-1,3.

15. A plastic polymer of dichloro-2,3-butadiene-1,3.

16. A non-plastic polymer of dichloro-2,3-butadiene-1,3.

17. A polymer of trichloro-2,3,4-butadiene-1,3.

18. A polymer prepared by polymerizing a mixture of dichloro-2,3-butadiene-1,3 and chloro-2-butadiene-1,3.

19. A plastic polymer prepared by incompletely polymerizing a mixture of dichloro-2,3-butadiene-1,3 and chloro-2-butadiene-1,3 and removing unpolymerized material.

20. A process for preparing new chemical compounds which comprises reacting a member of the group consisting of chloro-4-butadiene-1,2 and dichloro-2,4-butene-2 with chlorine.

21. A process for preparing new chemical compounds which comprises reacting chloro-4-butadiene-1,2 with chlorine.

22. A process for preparing new chemical compounds which comprises reacting chloro-4-butadiene-1,2 with chlorine, and separating from the products fractions boiling approximately at 41°–43° C., 62°–65° C., 74°–77° C., and 85°–90° C. at 11 mm. pressure.

23. A process for preparing new chemical compounds which comprises reacting dichloro-2,4-butene-2 with chlorine, and separating from the products fractions boiling approximately at 36°–40° C., 51°–55° C., and 82°–86° C. at 6 mm. pressure.

24. A process for preparing new chemical compounds which comprises removing hydrogen chloride from a chlorine addition product of chloro-4-butadiene-1,2 by treating with an alkaline agent.

25. A process for preparing new chemical compounds which comprises removing hydrogen chloride from a chlorine addition product of dichloro-2,4-butene-2 by treating with an alkaline agent.

26. A process for preparing new chemical compounds which comprises removing hydrogen chloride from chlorine addition products of compounds taken from the group consisting of chloro-4-butadiene-1,2 and dichloro-2,4-butene-2, by treating with an alkaline agent.

27. The process of claim 26 in which the alkaline agent is an alkali-metal hydroxide.

28. The process of claim 26 in which the reaction is at a temperature below 40° C.

29. The process of claim 26, further characterized in that the reaction mixture is subjected to fractional distillation in the presence of an inhibitor of polymerization.

30. A process for preparing a new chemical compound which comprises removing hydrogen chloride from trichloro-2,3,4-butene-1 by treating with an alkaline agent.

31. A process for preparing a new chemical compound which comprises removing hydrogen chloride from penta-chloro-1,2,2,3,4-butane by treating with an alkaline agent.

32. A process which comprises subjecting dichloro-2,3-butadiene-1,3 to conditions adapted to effect its polymerization.

33. A process which comprises subjecting trichloro-1,2,3-butadiene-1,3 to conditions adapted to effect its polymerization.

34. A process which comprises subjecting a mixture of chloro-2-butadiene-1,3 and a compound taken from the class consisting of dichloro-2,3-butadiene-1,3 and trichloro-1,2,3-butadiene-1,3 to conditions which will effect polymerization.

35. A process which comprises subjecting a mixture of chloro-2-butadiene-1,3 and a compound taken from the class consisting of dichloro-2,3-butadiene-1,3 and trichloro-1,2,3-butadiene-1,3 to conditions which will effect polymerization, disconnecting the polymerization while a substantial portion of the starting material still remains unpolymerized, and removing the unpolymerized material from the reaction mixture.

36. A process which comprises subjecting a mixture of chloro-2-butadiene-1,3 and a compound taken from the class consisting of dichloro-2,3-butadiene-1,3 and trichloro-1,2,3-butadiene-1,3 to conditions which will effect polymerization, discontinuing the polymerization while a substantial portion of the starting material still remains unpolymerized, and removing the unpolymerized material from the reaction mixture, then subjecting the plastic polymer to further polymerization to obtain a material resembling cured natural rubber.

WALLACE H. CAROTHERS.
GERARD J. BERCHET.

Certificate of Correction

Patent No. 1,965,369.                                                                  July 3, 1934.

WALLACE H. CAROTHERS ET AL.

It is hereby certified that errors appear in the printed specification of the above numbered patent requiring correction as follows: Page 5, line 105, for *"Chlorobntadiene"* read *Chlorobutadiene*; page 6, line 50, for the numbers "1,409" and "1,526" respectively, read *1.409* and *1.526*; page 7, claim 11, for the first "2" read *1*; and line 129, claim 35, for "disconnecting" read *discontinuing*; and that the said Letters Patent should be read with these corrections therein that the same may conform to the record of the case in the Patent Office.

Signed and sealed this 7th day of August, A. D. 1934.

[SEAL]                                                                             LESLIE FRAZER,
*Acting Commissioner of Patents*